(12) United States Patent
Kuczmarski et al.

(10) Patent No.: US 10,984,784 B2
(45) Date of Patent: Apr. 20, 2021

(54) FACILITATING END-TO-END COMMUNICATIONS WITH AUTOMATED ASSISTANTS IN MULTIPLE LANGUAGES

(71) Applicant: Google LLC, Mountain View, CA (US)

(72) Inventors: James Kuczmarski, San Francisco, CA (US); Vibhor Jain, Sunnyvale, CA (US); Amarnag Subramanya, Santa Clara, CA (US); Nimesh Ranjan, San Francisco, CA (US); Melvin Jose Johnson Premkumar, Sunnyvale, CA (US); Vladimir Vuskovic, Zollikerberg (CH); Luna Dai, San Francisco, CA (US); Daisuke Ikeda, Sunnyvale, CA (US); Nihal Sandeep Balani, Sunnyvale, CA (US); Jinna Lei, San Francisco, CA (US); Mengmeng Niu, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 277 days.

(21) Appl. No.: 16/082,175

(22) PCT Filed: Apr. 16, 2018

(86) PCT No.: PCT/US2018/027774
§ 371 (c)(1),
(2) Date: Sep. 4, 2018

(87) PCT Pub. No.: WO2019/172946
PCT Pub. Date: Sep. 12, 2019

(65) Prior Publication Data
US 2020/0320984 A1 Oct. 8, 2020

Related U.S. Application Data

(60) Provisional application No. 62/639,740, filed on Mar. 7, 2018.

(51) Int. Cl.
*G10L 15/00* (2013.01)
*G10L 15/183* (2013.01)
*G10L 15/22* (2006.01)

(52) U.S. Cl.
CPC .......... *G10L 15/183* (2013.01); *G10L 15/005* (2013.01); *G10L 15/22* (2013.01)

(58) Field of Classification Search
CPC ..... G10L 15/183; G10L 15/22; G10L 15/005; G10L 17/06; G10L 25/48; G10L 15/23;
(Continued)

(56) References Cited

U.S. PATENT DOCUMENTS

| 7,212,964 B1 | 5/2007 | Alshawi et al. |
| 7,797,688 B1 * | 9/2010 | Dubagunta ............... G06F 8/71 717/136 |

(Continued)

FOREIGN PATENT DOCUMENTS

| CN | 1350685 | 5/2002 |
| CN | 101154220 | 4/2008 |

(Continued)

OTHER PUBLICATIONS

China National Intellectual Property Administration; First Office Action issue in Application No. 201880001823.2; 10 pages; dated Mar. 31, 2020.
(Continued)

*Primary Examiner* — Abdelali Serrou
(74) *Attorney, Agent, or Firm* — Middleton Reutlinger

(57) ABSTRACT

Techniques described herein relate to facilitating end-to-end multilingual communications with automated assistants. In various implementations, speech recognition output may be generated based on voice input in a first language. A first language intent may be identified based on the speech recognition output and fulfilled in order to generate a first
(Continued)

natural language output candidate in the first language. At least part of the speech recognition output may be translated to a second language to generate an at least partial translation, which may then be used to identify a second language intent that is fulfilled to generate a second natural language output candidate in the second language. Scores may be determined for the first and second natural language output candidates, and based on the scores, a natural language output may be selected for presentation.

19 Claims, 6 Drawing Sheets

(58) Field of Classification Search
CPC ........... G10L 2015/223; G10L 15/1822; G10L 15/26; G10L 15/30; G10L 15/24; G10L 15/32; G10L 2015/228; G10L 15/00; G06F 40/47; G06F 40/58; G06F 40/40; G06F 40/42; G06F 40/44; G06F 40/45; G06F 40/49; G06F 40/51; G06F 40/53; G06F 40/55; G06F 40/56; G06F 17/28; G06F 3/167; G06F 40/30; G06F 16/90332; G06F 16/3334; G06F 16/3343; G06F 16/3344; G06F 40/35; G06N 20/00
See application file for complete search history.

(56) References Cited

U.S. PATENT DOCUMENTS

| | | | |
|---|---|---|---|
| 7,984,034 | B1 | 7/2011 | Shaw |
| 9,164,985 | B1 | 10/2015 | Viswanatha et al. |
| 9,607,102 | B2* | 3/2017 | Lavallee ................ G10L 15/00 |
| 9,633,317 | B2* | 4/2017 | Gabel ..................... G06N 5/022 |
| 10,088,853 | B2* | 10/2018 | Kolavennu ............ G06Q 50/01 |
| 10,452,782 | B1* | 10/2019 | Kumar ................... G06N 20/00 |
| 10,546,001 | B1* | 1/2020 | Nguyen ................. G06N 20/00 |
| 10,733,222 | B1* | 8/2020 | Miller ..................... G10L 15/18 |
| 2007/0022134 | A1 | 1/2007 | Zhou et al. |
| 2007/0198245 | A1 | 8/2007 | Kamatani et al. |
| 2009/0024595 | A1 | 1/2009 | Chen |
| 2009/0125497 | A1 | 5/2009 | Jiang et al. |
| 2011/0125483 | A1 | 5/2011 | Manuel-Devadoss |
| 2013/0144900 | A1 | 6/2013 | Murphy et al. |
| 2013/0151235 | A1 | 6/2013 | Och et al. |
| 2013/0238312 | A1 | 9/2013 | Waibel |
| 2014/0272821 | A1* | 9/2014 | Pitschel ................. G09B 19/06 434/157 |
| 2014/0278343 | A1 | 9/2014 | Tran |
| 2015/0142447 | A1* | 5/2015 | Kennewick ............. G10L 15/22 704/275 |
| 2015/0142704 | A1 | 5/2015 | London |
| 2015/0340033 | A1* | 11/2015 | Di Fabbrizio ...... G10L 15/1815 704/254 |
| 2015/0370780 | A1 | 12/2015 | Wang et al. |
| 2016/0042748 | A1* | 2/2016 | Jain ......................... G10L 15/30 704/9 |
| 2016/0147744 | A1 | 5/2016 | Wang et al. |
| 2017/0091177 | A1* | 3/2017 | Sonoo .................... G10L 13/08 |
| 2017/0270925 | A1* | 9/2017 | Kennewick ............. G10L 15/00 |
| 2019/0213999 | A1* | 7/2019 | Grupen ............ G06F 16/90332 |
| 2019/0325873 | A1* | 10/2019 | Mathias .................. G10L 13/08 |

FOREIGN PATENT DOCUMENTS

| | | |
|---|---|---|
| CN | 102799579 | 11/2012 |
| CN | 104991892 | 10/2015 |
| CN | 107170453 | 9/2017 |
| JP | H11259089 | 9/1999 |
| JP | 2007220045 | 8/2007 |
| WO | 2013134106 | 9/2013 |
| WO | 2017197187 | 11/2017 |

OTHER PUBLICATIONS

European Patent Office; Intention to Grant, Application No. EP18722831.7, 54 pages; dated Jan. 29, 2020.
Japan Patent Office; Notice of Allowance, Application No. JP2018-548678, 3 pages, dated Feb. 17, 2020.
The Korean Intellectual Property Office; Notice of Allowance issued in Application No. 10-2018-7028532 dated Aug. 16, 2019.
International Search Report and Written Opinion of PCT Ser. No. PCT/US2018/027774 dated Jun. 15, 2018.
China National Intellectual Property Administration, Notice of Office Action Issued in Application No. 201880001823, 6 pages; dated Aug. 19, 2020.
European Patent Office; Communication issued in Application No. 20176134.3; 7 pages; dated Aug. 10, 2020.
China National Intellectual Property Administration; Notice of Allowance issue in Application No. 201880001823.2; 4 pages; dated Jan. 13, 2021.

* cited by examiner

FACILITATING END-TO-END COMMUNICATIONS WITH AUTOMATED ASSISTANTS IN MULTIPLE LANGUAGES

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using free form natural language input which may be vocal utterances converted into text and then processed, and/or typed free form natural language input. Automated assistants are typically invoked using predetermined vocal utterances (e.g., "OK Assistant") and often perform various types of processing, such as speech-to-text processing and/or natural language processing, only on those vocal utterances that follow an invocation phrase.

Automated assistants are adept at communicating with users in some widely-used languages, such as English, but are less able to communicate in other languages. However, conventional techniques for configuring automated assistants to communicate in new languages are resource-intensive. For each new language, it may be necessary to generate new trigger grammars (i.e., words or phrases intended to invoke a particular action by the automated assistant), recognize query intents in the new language (which require different natural language processing components for different languages), and to generate natural language output that is comprehensible in the new language. Adding to the challenge, each language has myriad idiosyncrasies (e.g., morphologically rich, pro-drop, gender neutrality, etc.) and language experts who can build these systems in particular languages may be hard to find.

SUMMARY

Techniques are described herein for facilitating end-to-end processing of human-to-computer dialogs in various languages by leveraging the processing in a particular language. Put another way, techniques described herein increase language coverage for automated assistants. In various implementations, user queries provided to automated assistants may be processed using multiple pipelines. For example, in some implementations, a first pipeline may be employed to attempt to process the user's query in the original language of the query. A second pipeline may be employed to translate the user's query to a different language that the automated assistant is better-equipped to handle, and to use the translation to identify and fulfill the user's intent. Natural language output returned via the second pipeline may or may not be translated back to the user's original language. In various implementations, the natural language output generated via the multiple pipelines may be ranked, e.g., based on confidence scores, and the highest ranked natural language output may be presented to the user.

It may be desirable to preserve portions of a user's original query in the user's spoken language. For example, in some implementations, slot values may be identified in the user's original query (or more specifically, in speech recognition output generated from the user's original voice input). These slot values may not need to be translated, and in some cases translating them might lead to errors. For example, suppose a user utters the phrase, "What is Akash's phone number?" The name "Akash" may translate to some word in English that has a particular meaning (e.g., sky) that is unrelated to the user's intent. However, if the word "Akash" can be identified as a slot value and thereby preserved in the user's spoken language, the remainder of the user's query may be properly translated so that an appropriate responsive action may be taken.

Most languages have various colloquialisms. In addition, colloquialisms may be built into the natural language output generation process so that automated assistants can provide output that sounds more "human." For example, suppose a user asks about the weather today in a language that is not yet well supported. The user's query may be translated to a more widely-supported language, such as English, and then the user's intent may be identified and fulfilled. However, for common queries like this it is highly possible that informal (e.g., "humanlike") natural language output may be available as alternatives to straight-forward natural language output. For example, suppose it is supposed to be hot and sunny today. Rather than simply generating natural language output such as "It will be 90 degrees and sunny," the automated assistant may instead select natural language output that is, for instance, generated manually, to sound more human, such as "Better grab your sunglasses because it's gonna be a scorcher." Translating this colloquial-sounding natural language output back to the user's native language may yield results that are nonsensical to the user. Accordingly, in some implementations, natural language output that may be difficult to translate, e.g., because it includes manually-generated colloquialisms, slang, etc., may be replaced with more straight-forward natural language output that is more likely to be properly translatable to the user's native language.

In some implementations, a method performed by one or more processors is provided that includes: receiving voice input provided by a user at an input component of a client device in a first language; generating speech recognition output from the voice input, wherein the speech recognition output is in the first language; identifying a first language intent of the user based on the speech recognition output; fulfilling the first language intent to generate first fulfillment information; based on the first fulfillment information, generating a first natural language output candidate in the first language; translating at least a portion of the speech recognition output from the first language to a second language to generate an at least partial translation of the speech recognition output; identifying a second language intent of the user based on the at least partial translation; fulfilling the second language intent to generate second fulfillment information; based on the second fulfillment information, generating a second natural language output candidate in the second language; determining scores for the first and second natural language output candidates; based on the scores, selecting, from the first and second natural language output candidates, a natural language output to be presented to the user; and causing the client device to present the selected natural language output at an output component of the client device.

These and other implementations of technology disclosed herein may optionally include one or more of the following features.

In various implementations, the method may further include generating a third natural language output candidate in the first language that is responsive to the second language intent. In some such implementations, determining the scores may further include determining scores for the first, second, and third content.

In various implementations, the method may further include translating the second natural language output candidate to the first language prior to the scoring. In various implementations, translating the second natural language output candidate may be based on a machine learning model that is trained using one or more logs of natural language outputs provided by one or more automated assistants during human-to-computer dialogs.

In various implementations, the translating to generate the at least partial translation of the speech recognition output may be based on a machine learning model that is trained using one or more logs of user queries submitted to one or more automated assistants during human-to-computer dialogs. In various implementations, the scoring may be based on respective confidence scores assigned to the first and second natural language intents. In various implementations, the scoring may be based on time required to obtain the first and second natural language output candidates.

In various implementations, the method may further include identifying a slot value in the speech recognition output. In some such implementations, the at least partial translation of the speech recognition output may exclude the slot value, and the second language intent may be further identified based on the slot value in the first language.

In another aspect, a method may include the following operations: receiving voice input provided by a user at an input component of a client device in a first language; generating speech recognition output of the voice input in the first language; translating at least a portion of the speech recognition output from the first language to a second language to generate an at least partial translation of the speech recognition output; identifying a second language intent of the user based on the at least partial translation; fulfilling the second language intent to generate fulfillment information; generating natural language output in the second language based on the second language intent; translating the natural language output to the first language to generate translated natural language output; determining whether the translated natural language output satisfies one or more criteria; based on the determining, selecting output that is based on the translated natural language output or alternative natural language output; and causing the client device to present the output at an output component of the client device; and causing the client device to present the selected natural language output at an output component of the client device.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
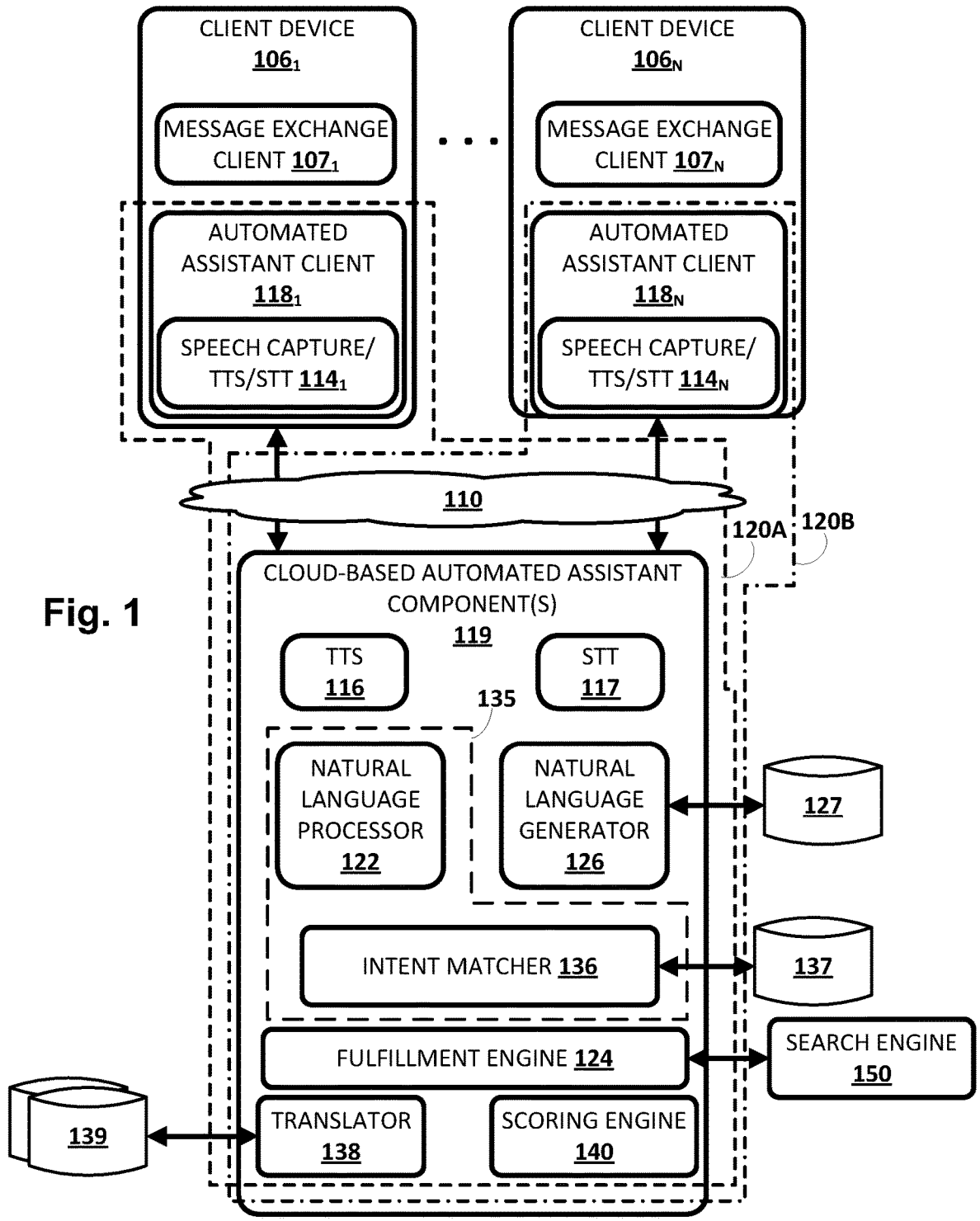
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language understanding engine 135, may be implemented on one or more computing systems (collectively referred to as a "cloud" computing system) that are communicatively coupled to client devices $106_{1-N}$ via one or more local and/or wide area networks (e.g., the Internet) indicated generally at 110.

In some implementations, plurality of client computing devices $106_{1-N}$ (also referred to herein simply as "client devices") may be associated with each other in various ways in order to facilitate performance of techniques described herein. For example, in some implementations, plurality of client computing devices $106_{1-N}$ may be associated with each other by virtue of them being members of a coordinated ecosystem of client devices 106 that are operated by one or more users (e.g., an individual, a family, employees of an organization, other predefined groups, etc.).

As noted in the background, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119. It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

Each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may engage interactive voice response ("IVR"), such that the user can utter commands, searches, etc., and the automated assistant may utilize speech recognition to convert the utterances into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various implementations, each automated assistant client 118 may include a corresponding speech capture/text-to-speech ("TTS")/speech-to-text ("STT") module 114. In other implementations, one or more aspects of speech capture/TTS/STT module 114 may be implemented separately from automated assistant client 118. In various implementations, speech capture/TTS/STT module 114 may generate speech recognition output based on a vocal query. This speech recognition output may be analyzed pursuant to techniques described herein.

Each speech capture/TTS/STT module 114 may be configured to perform one or more functions: capture a user's speech, e.g., via a microphone; convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language understanding engine 135, the aforementioned TTS module 116, the aforementioned STT module 117, and other components that are described in more detail below. In some implementations, one or more of the engines and/or modules of automated assistant 120 may be omitted, combined, and/or implemented in a component that is separate from automated assistant 120. In some implementations, to protect privacy, one or more of the components of automated assistant 120, such as natural language processor 122, speech capture/TTS/STT module 114, etc., may be implemented at least on part on client devices 106 (e.g., to the exclusion of the cloud).

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 of natural language understanding engine 135 processes natural language input generated by users via client devices $106_{1-N}$ and may generate annotated output (e.g., in textual form) for use by one or more other components of automated assistant 120. For example, the natural language processor 122 may process natural language free-form input that is generated by a user via one or more user interface input devices of client device $106_1$. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological engine that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Natural language understanding engine 135 may also include an intent matcher 136 that is configured to determine an intent of a user engaged in a human-to-computer dialog session with automated assistant 120. While depicted separately from natural language processor 122 in FIG. 1, in other implementations, intent matcher 136 may be an integral part of natural language processor 122 (or more generally, of a pipeline that includes natural language processor 122). In some implementations, natural language processor 122 and intent matcher 136 may collectively form the aforementioned "natural language understanding" engine 135.

Intent matcher 136 may use various techniques to determine an intent of the user, e.g., based on output from natural language processor 122 (which may include annotations and terms of the natural language input). In some implementations, intent matcher 136 may have access to one or more databases 137 that include, for instance, a plurality of mappings between grammars and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" As will be described in more detail below, in addition to or instead of grammars, in some implementations, intent matcher 136 may employ one or more trained machine learning models, alone or in combination with one or more grammars. These trained machine learning models may also be stored in one or more databases 137.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

In some implementations, automated assistant 120 may facilitate (or "broker") transactions between users and third party applications. These third party applications may or may not operate on computing systems that are separate from those that operate, for instance, cloud-based automated assistant components 119. Accordingly, one kind of user intent that may be identified by intent matcher 136 is to engage a third party application. For example, automated assistant 120 may provide access to an application programming interface ("API") to a pizza delivery service. A user may invoke automated assistant 120 and provide a command such as "I'd like to order a pizza." Intent matcher 136 may map this command to a grammar (which may be added to database 137 in some cases by the third party) that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 106) natural language output that solicits parameters for the slots.

In the human-to-computer dialog domain, the vocabulary employed by users and by automated assistant 120 may be somewhat less comprehensive than what is employed in everyday conversation, literature, writing, etc. In other words, a limited language space employed during human-to-computer dialogs is typically going to be a subset of a more comprehensive language space used for more general purpose human-to-human communication (e.g., talking, writing, etc.). For example, users tend to engage with automated assistants 120 to cause one or more tasks to be performed. Even in the context of general search queries, users tend to engage with automated assistants to perform particular types of queries, such as asking about the weather, traffic, transit times, restaurant hours, etc.

Accordingly, in some implementations, natural language understanding engine 135, e.g., by way of natural language processor 122 or intent matcher 136, may have access to one or more models (e.g., in database 137) that are trained in a particular language to understand the specific and limited vocabulary typically employed in human-to-computer dialogs with automated assistant 129. These models may be trained in a particular language, e.g., using logs of natural language inputs translated to the particular language, to determine users' intents in the particular language. This is especially helpful for languages that are not yet fully supported (i.e., for which comprehensive translation is not yet available). For example, common queries (e.g., order food, check weather, set timer, etc.) in a widely supported language, such as English, may be obtained from log(s) and translated (e.g., automatically by translator 138, manually by linguists/translators, etc.) into a less-widely-supported second language. These translated common queries may be used in conjunction with their matching intents as training examples to train a model for the less-widely supported second language.

For example, the English queries may be translated, e.g., using translator 138 and/or human linguists/translators, into the less-widely supported language. The translations may be used as training examples, labelled with corresponding intents (which also may be translated into the less-widely supported language), to train the model. If the model is some flavour of a neural network, the labelled training examples may be applied as input across the neural network to generate output. The output may be compared to the corresponding labels to generate an error. Based on the error, various training techniques, such as gradient descent (stochastic or batch) and back propagation may be employed to adjust weights of one or more hidden layers of the neural network.

In some implementations, previously-unseen queries in the less-widely supported language may be applied as input across the model to generate output. In some such implementations, the output may take the form of embeddings into a reduced-dimensionality space associated with the language. Intents may be matched to these previously-unseen queries based on their proximity (e.g., Euclidean distance, cosine similarity, etc.) with other embeddings in the reduced-dimensionality space. If a user who provides a previously-unseen query rejects the ultimate outcome, then the user's query may be used as a negative training example to further train the model. If a user who provides a new query provides positive feedback (or no feedback, which may indicate the user is satisfied), then the user's query may be used as a positive training example to further train the model. In this manner it is possible for automated assistant 120 to "learn" how to predict intents in a new language.

Fulfillment engine 124 may be configured to receive the intent output by intent matcher 136, as well as an associated slot values (whether provided by the user proactively or solicited from the user) and fulfill the intent. In various implementations, fulfillment of the user's intent may cause various fulfillment information (which may be language-agnostic in some instances) to be generated/obtained, e.g., by fulfillment engine 124. As will be described below, the fulfillment information may in some implementations be provided to a natural language generator ("NLG" in some FIG. 126), which may generate natural language output based on the fulfillment information.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 136, as being a search query. The intent and content of the search query may be provided to fulfillment engine 124, which as depicted in FIG. 1 may be in communication with one or more search engines 150 configured to search corpuses of documents and/or other data sources (e.g., knowledge graphs, etc.) for responsive information. Fulfillment engine 124 may provide data indicative of the search query (e.g., the text of the query, a reduced dimensionality embedding, etc.) to search engine 150. Search engine 150 may provide responsive information, such as GPS coordinates, or other more explicit information, such as "Timberline Lodge, Mt. Hood, Oreg." This responsive information may form part of the fulfillment information generated by fulfillment engine 124.

Additionally or alternatively, fulfillment engine 124 may be configured to receive, e.g., from natural language understanding engine 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

As noted above, natural language generator 126 may be configured to generate and/or select natural language output (e.g., spoken words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

If a user's intent is to search for general information, then natural language generator 126 may generate natural language output that conveys information responsive to the user's, e.g., in sentence form. In some instances, the natural language output may be extracted, e.g., by natural language generator 126, unaltered from documents (e.g., because it is already in complete sentence form) and provided as is. Additionally or alternatively, in some implementations, the responsive content may not be in complete sentence form (e.g., a request for today's weather may include a high temperature and chance of precipitation as standalone pieces of data), in which case natural language generator 126 may compose one or more complete sentences or phrases which presents the responsive content as natural language output.

As was the case with natural language understanding engine 135 (e.g., intent matcher 136), natural language generator 126 may operate in a language space that is smaller than (e.g., a subset of) a more comprehensive language space used for general purpose communication. Accordingly, and as was the case with natural language understanding engine 135, in some implementations, natural language generator 126 may have access to one or more databases 127 that may store, for instance, one or more language-specific models that are specifically trained to generate natural language output in the human-to-computer dialog context. Training these reduced models may be less intensive than training comprehensive models, and thus may facilitate earlier rollout of automated assistant 120 in languages for which comprehensive automated translation and/or general capabilities in a particular language are not yet supported.

In some implementations, human-to-computer dialog knowledge gained during human-to-computer dialogs in well-supported languages such as English may be leveraged to train models specific to other, less-supported languages. For example, a corpus of natural language outputs, e.g., phrases, templates (described in more detail below), and so forth, may be translated (e.g., manually by linguists and/or translators) into a second language and then used as training data to train a natural language generation model for the second language that is usable by natural language generator 126 to generate natural language output in the second language.

In some implementations, each training example of the training data may include, as input (e.g., as an input vector), an intent that lead to a particular English natural language output phrase/sentence being generated, as well as user-provided slot values, if any. The training example may be labeled with the translated version of the English natural language output phrase/sentence. The input may be applied across the natural language generation model (e.g., a neural network, etc.) to generate output that is then compared to the label to determine error. Based on the error, various training techniques, such as back propagation, gradient descent (stochastic or batch), and so forth, may be applied to adjust the natural language generation model's weights.

Once trained, such a natural language generation model can be used, for instance, to generate an embedding of a subsequently determined user intent into a reduced dimensionality space (e.g., an embedding space that is associated with potential natural language output in the second language). The embedding's proximity (e.g., determined using Euclidian distance, cosine similarity, etc.) to other similar intents' embeddings may be used to identify natural language output that was used in response to the other embeddings. Natural language generator 126 may then use the same or similar natural language outputs.

In some implementations, natural language generator 126 may rely on what will be referred to herein as "natural language generation templates" (or "NLG templates") to generate natural language output. In some implementations, NLG templates may be stored in database 127. NLG templates may include logic that dictates formulation of natural language output in response to various information from various sources, such as pieces of data included with fulfillment information generated by fulfillment engine 124. Thus, in some ways an NLG template may, in effect, constitute a state machine, and may be created using any known programming language or other modeling language (e.g., Unified Modeling Language, Specification and Description Language, etc.).

As an example, an English NLG template may be configured to respond to English language requests for weather information. The NLG template may dictate which of a plurality of candidate natural language outputs are provided under a plurality of circumstances. For example, suppose fulfillment information generated by fulfillment engine 124 indicates that the temperature will be above, say, 80 degrees Fahrenheit and there will be no clouds. Logic set forth in the NLG template (e.g., if/else statements) may dictate that the natural language output selected by natural language generator 126 be a phrase such as "It's gonna be a scorcher, don't forget your sunglasses." Suppose fulfillment information generated by fulfillment engine 124 indicates that the temperature will be below, say, 30 degrees Fahrenheit and there will be snow. Logic set forth in the NLG template may dictate that the natural language output selected by natural language generator 126 be a phrase such as "It's gonna be chilly, you might want a hat and gloves, and be careful on the road." And so on.

In some implementations, NLG templates in one well-supported language, such as English, may be translated to another less-supported language. For example, linguist(s) and/or translator(s) may manually edit an NLG template in one language so that the natural language output options contained therein are translated to another language. In some implementations, a design application may be provided that causes a computing device to render a graphical user interface ("GUI"). The GUI may include a graphical representation of logic contained in an NLG template presented in an intuitive way, such as a logic flow chart (e.g., with nodes representing states and edges representing transitions between states). In some such implementations, nodes of the logic flow chart may, where applicable, include candidate natural language output statements (sometimes with placeholders substituted for words/phrases that are dependent on fulfillment information provided by fulfillment engine 124 and/or on slot values) that may be editable by linguists and/or translators. This may allow individuals who lack extensive programming knowledge but are trained in translation to translate only the natural language output, without having to deal with the underlying logic.

Some languages are more speaker/listener-agnostic than others, and therefore natural language output in those languages may be relatively uniform under a variety of circumstances. However, other languages include rules that dictate how particular words or phrases are spoken, such as gender-based rules, formality-based rules, etc. Accordingly, in some implementations, an NLG template generated for one speaker/listener-agnostic language, when translated to another less-speaker/listener-agnostic language, may require additional logic. For example, when translating an English NLG template to a Spanish NLG template, it may be necessary to add additional logic to the translated NLG template to account for a gender of the user and/or a gender associated with the voice employed by automated assistant 120 (e.g., there may be an option to select from different computer-generated voices, such as a male and female voice). Vice versa, when translating an NLG template from Spanish to English (or another speaker/listener agnostic language), it may be necessary to simplify the template so that unnecessary gender-selection logic (and/or formality selection logic) is removed.

As noted in the background, automated assistants are adept at communicating with users in some widely-used languages, such as English. This may be for a variety of reasons, such as the automated assistants being developed in countries in which English is the most commonly-spoken language. However, automated assistants may be less adept at communicating with users in other languages. Every language has myriad idiosyncrasies that make adapting automated assistant 120 for communication in those language difficult, often requiring substantial human intervention by language experts. Moreover, third party application developers may lack the resources to adapt their systems for communication in multiple languages.

Various techniques exist for automatically translating text in one language to another. Various models exists that are configured to receive input in a first language, and provide output in a second language. For example, many web browsers offer the capability of translating web pages to different languages. Additionally, some web services are equipped to receive user input in one language, and to provide output in another language selected by the user.

Accordingly, in various implementations, a translator 138 may be provided, e.g., as part of cloud-based automated assistant components 119 or separately, that may be configured to translate content between various languages. In FIG. 1, translator 138 has access to one or more database 139 that may include various types of data (e.g., dictionaries, trained translation models, etc.) that is usable to translate from one language to another. For example, a first database may facilitate translation from a first language to a second language, and vice versa. A second database may facilitate translation from the first language to a third language, and vice versa. And so on.

In some implementations, translator 138 may implement a statistical machine translation service that translates text from various source languages to a canonical language (e.g., English), and then from the canonical language to a target language. Additionally or alternatively, in some implementations, translator 138 may implement a neural machine translation ("NMT") engine that translates whole sentences or phrases at a time, rather than individual tokens, so that the overall context of textual input can be leveraged.

In some implementations, a conventional neural machine translation ("NMT") model, e.g., already in use by translator 138 to perform general purpose translation, may be augmented (i.e. specially trained) to be better at translating and understanding language used specifically during human-to-computer dialog sessions. This augmented NMT model will be referred to herein as a "natural language understanding-neural machine translation" ("NLU-NMT") model.

First, training data may be collected from logs of queries/intents generated during human-to-computer dialogs between users and automated assistant 120. For example, a random sample of queries in a well-supported language, e.g., English, and a random sample of queries in another less-well-supported language ("language L" for this example) may be obtained from the logs. Additionally or alternatively, some number of "top" queries (e.g., the most frequent) in English and language L may also be obtained.

This data may be translated manually, e.g., by human linguists/translators, to and/or from English to generate a first set of pairs, <sentence-en, sentence-L>. This set of pairs will be used as training data for the NLU-NMT. Next, more training data may be added to the training data for the NLU-NMT model by (i) obtaining a relatively large number of additional queries from the same automated assistant logs, and (ii) machine translating, e.g., by translator 138, these additional queries to generate a second set of pairs, <sentence-en, sentence-L>. The first and second sets of pairs may be combined and used to re-train (i.e. augment) an existing NMT model already utilized by translator 138, e.g., to generate the NLU-NMT model. Thereafter, the NLU-NMT model may be better than the conventional NMT model alone in translating, from language L to English, the types of queries users typically ask automated assistant 120.

Using the queries in the second language (e.g., English) as a base to collect the training data allows to prepare the NLU-NMT model ahead of time, even before starting to implement automated assistant 120 in the first language. In some implementations, when logs in the second language (e.g., English) are available, the NLU-NMT model can be further retrained by providing a new training set obtained by taking logs from the second language, and translating them via human translators, and via machine translation.

As is the case with language used by users when engaging with automated assistant 120, the type of natural language that is generated by automated assistant 120 is a subspace of language used during general-purpose human-to-human communication. Accordingly, in some implementations, a similar process as described above with respect to the NLU-NMT model may be used, e.g., by natural language generator 126, to generate natural language output.

As noted above, some conventional translators already employ a neural machine translation ("NMT") model to perform general purpose translation between two languages. Thus, and similar to the NLU-NMT model described previously, the conventional NMT model may be augmented (i.e. retrained) with training data gathered from logs of natural language output provided by automated assistant 120 during human-to-computer dialogs with users to generate a natural language generation-neural translation model ("NLG-NMT"). For example, these natural language outputs obtained from the logs may be translated, e.g., manually by linguists/translators and/or automatically, e.g., by translator 138, into pairs of <sentence-EN, sentence-L>, as described previously. These pairs may then be used to re-train the NMT model already employed by translator 138 into the NLG-NMT model that is better able to translate natural language outputs typically employed by automated assistant 120 during human-to-computer dialog sessions.

In some implementations, the NLG-NMT model may be trained to translate language output(s) generated via one or more NLG language templates. The retraining can be achieved by providing a new training set. In some implementations the training set can be obtained by translating the most frequently generated sentences in the more widely-supported language (e.g. English) via human translators. In some implementations this set can be augmented by translating, e.g., automatically via translator 138, a large number of algorithmically-generated example realizations of NLG templates.

In various implementations the NLG-NMT model may be trained to more precisely translate answers originating from a variety of other sources. For example, the NLG-NMT model may be trained to more precisely train answers to general inquiries obtained from web documents. In particular, manually-translated versions of top answers from online documents to common queries may be provided in the widely-supported language (e.g. English) as an additional training set to retrain the NLG-NMT model. As another example, in some implementations, the NLG-NMT model may be trained to translate answers originating from a "personality" database. "Personality" answers (which may include colloquialism) are answers written by creative writers to answer particular types of user queries. Examples of answers that may be written by creative writers may include, for instance, the "It's gonna be a scorcher" example described elsewhere herein. These personality answers may be manually translated and then used as yet another training set for the NLG-NMT model.

Figure 2:
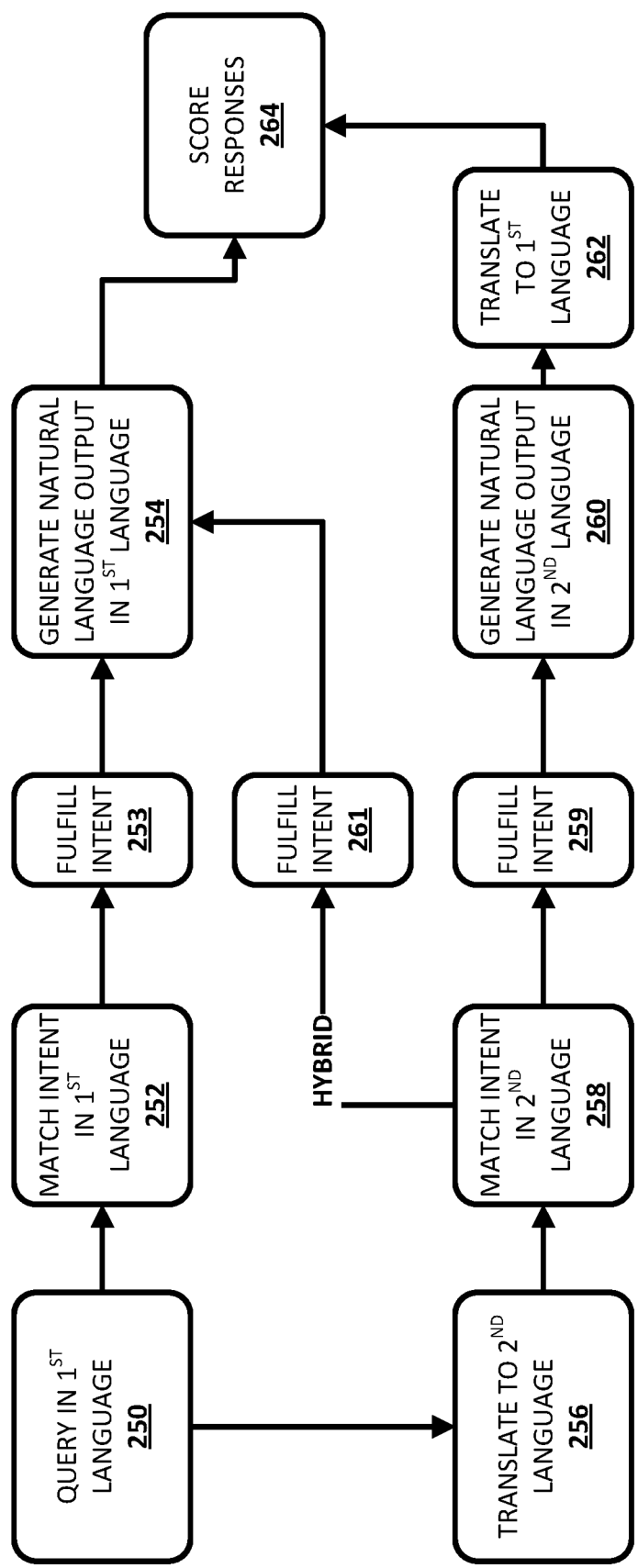
FIG. 2 depicts an example process flow that demonstrates various aspects of the present disclosure, in accordance with various implementations.

FIG. 2 depicts one example process flow by which a user's free-form input (e.g., spoken or typed) may be processed using multiple pipelines in accordance with various implementations. At block 250, a free form input (or "query") is received, e.g., at a microphone of a client device 106. The query may seek information (e.g., "what's the weather today?", "what's the capitol of France?") and/or initiation of one or more actions (e.g., ordering food, playing music, creating a reminder, creating a calendar entry, sending a message to someone else, setting a timer, etc.). For illustrative purposes, assume the query is received in the user's native language. For this example it can also be assumed that the query at block 250 has already been speech recognized (e.g., by module 114 and/117 in FIG. 1), so that the query is in textual form (although other forms, such as reduced-dimensionality embeddings of the user's utterance, are also possible). The received query may be provided to multiple processing pipelines, each configured to (i) identify the user's intent (and any slot values required to fulfill the intent), (ii) fulfill the identified intent, and (iii) generate natural language output based on fulfillment of the identified intent.

A first pipeline may begin at block 252, at which point intent matcher 136 may attempt to determine the user's intent in the user's native language (which is referred to as the "$1^{st}$ language" in FIG. 2). As noted above, in some implementations, intent matcher 136 may employ one or more training machine learning models (e.g., neural networks) to embed the query into a reduced dimensionality space and determine its proximity to other embeddings associated with other intents. Additionally or alternatively, intent matcher 136 may utilize one or more grammars to determine the user's intent.

In some implementations, the intent determined at block 252 (which also may be referred to as the "first language intent") may be scored, e.g., by scoring engine 140, to determine a confidence measure that the matched intent is truly that of the user. If support for the user's native language is relatively strong already, a confidence measure associated with the matched intent may be relatively high. However, in situations in which the user's native language is not yet well-supported, the confidence measure may be relatively low. In some implementations, if the confidence measure in the matched first language intent does not satisfy some criterion, such as a predetermined threshold, the processing of the first pipeline may be abandoned before it proceeds further. In some implementations, the confidence measure associated with this matched intent may be compared with confidence measures determined for other matched intents determined using other pipelines (described below), and the highest confidence intent may be used to fulfill the user's request.

At block 253, the first language intent identified in the user's native language at block 252 may be used, e.g., by fulfillment engine 124, to fulfill the user's request. In various scenarios, the user's intent may also be fulfilled with other data points, such as slot value(s) provided by the user and/or data points obtained from various other sources. As described previously, fulfillment of the user's intent may cause fulfillment engine 124 to generate fulfillment information that includes responsive content. In some implementations this may include content from various corpuses of documents (e.g., similar corpuses that are searched by conventional search engines) that are in the user's native language, and/or from more general corpuses for which documents in the user's language are more heavily biased as search results. In some implementations, this may include content that is controlled by the user, such as information from the user's calendar, reminder list, etc. Additionally or alternatively, the fulfillment information may include responsive action(s) such as playing media, ordering products/services, etc.

At block 254, the fulfillment information may be used, e.g., by natural language generator 126, to generate a first natural language output candidate in the user's native language. As described previously, in some implementations, this may include natural language generator 126 applying the fulfillment information as input across a machine learning model trained in the user's native language to generate output used to formulate the first natural language output candidate. Additionally or alternatively, this may include implementing logic contained in an NLG template in the user's native language to generate natural language output. As will be described below, the natural language output generated at block 254 may then be provided to scoring engine 140 for scoring at block 264.

In various implementations, one or more additional pipelines may be implemented, e.g., in parallel with the pipeline defined by blocks 252-254. For example, a second pipeline may begin at block 256, where the user's query may be translated, e.g., by translator 138, into a second language that may be more fully supported. While English is indicated as being a fully supported language in examples described herein, this is not meant to be limiting. In some implementations, translator 138 may employ the NLU-NMT model described previously to perform the translation of block 256. As noted above, applying the user's query as input across the NLU-NMT model may generate output that is more likely to accurately predict the user's intent than output generated by a conventional NMT model already used for general purpose translation.

At block 258, the translation of the user's query is matched, e.g., by intent matcher 136, to one or more intents in the second language (also referred to as the "second language intent"). As was the case with block 252, in various implementations, the second language intent matched at block 258 may be scored, e.g., by scoring engine 140, to determine, for instance, a measure of confidence. This measure of confidence may be compared, for instance, to the measure of confidence determined for the matched first language intent of block 252. In some implementations, the intent having the highest confidence measure (or at sufficiently higher confidence measure) may be selected, and only the pipeline associated with that selected intent may continue processing.

At block 259, the second language intent matched at block 258 may be fulfilled, e.g., by fulfillment engine 124, to generate second fulfillment information, similar to block 253. At block 260, the fulfillment information generated at block 259 may be used, e.g., by natural language generator 126, to generate a second natural language output candidate in the second language, similar to block 254. In some implementations, the second natural language output candidate (which is in the second language) may then be translated, e.g., by translator 138, back to the first language (i.e. the user's native language) at block 262, resulting in a translated second natural language output candidate.

In various implementations, the first natural language output candidate generated at block 254 (in the first language) and the second natural language output candidate generated at block 260 (in the second language) that has been translated back to the first language at block 262 may be scored, e.g., by scoring engine 140. In various implementations, the natural language output candidate (both now in the first language) having the highest score may be selected for presentation to the user. Various criteria may be used when scoring natural language output candidates. In some implementations, the natural language output candidates may be scored at least in part based on the confidence measure determined for the intent (blocks 252 and 258) that yielded the natural language output. Additionally or alternatively, in some implementations, the second natural language output candidate that is translated into the first language at block 262 may be scored based on a quality of the translation (some translation models are configured to score their respective translations).

In some implementations, another (third) pipeline may be established as a "hybrid" of the first and second pipelines defined by blocks 252-254 and 256-262, respectively. For example, in some implementations, after the user's intent is matched in the second language at block 258, an attempt may be made at block 261 to fulfill that matched intent in the first language, as indicated by the arrow labeled "HYBRID." At block 254, fulfillment information generated at block 261 may be used, e.g., by natural language generator 126, to generate a third natural language output candidate. In some implementations, this third natural language output candidate may be scored along with the other natural language output candidates at block 264.

Implementing this series (e.g., hierarchy) of pipelines may improve the quality of automated assistant 120 in already supported languages. By activating the new pipelines, more queries will be correctly understood and executed. Moreover, the use of multiple pipelines speeds up the development of automated assistant 120, without sacrificing the quality of its responses to users' queries. In some implementations, linguists working on implementing automated assistant 120 in a new language can write grammars, train native understanding models, and/or provide language templates for those queries that do not work out of the box using the second and third pipelines (256-262 or 256→258→261→254, respectively).

Each of the three pipelines depicted in FIG. 2 may be particularly adept at processing certain types of queries. The first pipeline, 252-254, may be especially suitable for processing queries that are simple and/or commonly encountered in the human-to-computer dialog context. Suppose comprehensive translation for the Serbian language is not yet fully supported, but that some grammars for Serbian are already available and/or a machine learning model available to intent matcher 136 (e.g., stored in database 137) has been trained, e.g., using logs of English query/intent pairs translated into Serbian, to understand rudimentary queries commonly found in the automated assistant dialog context. Suppose further that a Serbian user speaks the phrase, "Zovi Ivana," which in English means "Call Ivan." This type of query lies at the core of the capabilities of automated assistant 120. Consequently, this query is easily processed using the first pipeline 252-254. The score assigned to the resulting natural language output candidate at block 264 would likely be higher than scores associated with any other natural language output candidates produced from the other two pipelines, if they even had time to complete.

The second pipeline, 256-262, may be more suitable for queries for which natural language output generation will prove to be the most complex and/or difficult. For example, suppose a Serbian speaker issues the command, "'Koliko je brz najbrzi covek na svetu?" At block 256 this query may be translated (e.g., by translator 138) from Serbian to English as "How fast is the fastest man in the world?" At block 258, this translation may be used to determine an intent of GET_INFORMATION, with terms of the query forming one or more parameters/slot values. At block 259, the intent may be fulfilled, e.g., by performing a standard Internet search for relevant documents and extracting the requested information from those documents. In this example, the answer in English would be "The data on Usain Bolt showed that he reached at top speed of 12.27 metres per second, which is 27.44 miles per hour." Because this statement is informational and relatively lengthy, at block 260, natural language generator 126 may simply use this language verbatim as natural language output. At block 262, translator 138 may translate this English statement to Serbian, and the Serbian translation may be scored at block 264.

The third, hybrid pipeline, 256→258→261→254, may be more suitable for queries that generate relatively simply intents and/or fulfillment information. Suppose a Serbian speaker issues the query, "Podesi alarm za 9 ujutru." At block 256 this query may be translated (e.g., by translator 138) from Serbian to English as "Set an alarm for 9 in the morning." At block 258, this translation may be used to determine an intent of SET_ALARM and a parameter of 9 AM the next day. Once this intent is fulfilled at block 261, natural language generator 126 would normally generate, e.g., from an English NLG template, the natural language output, "Alright, alarm set for 9 am." However, such an NLG template (and in particular, the output candidates contained therein) may be relatively straightforward to translate from English to Serbian. Accordingly, and assuming a Serbian translation of the NLG template has been generated (e.g., by linguists and/or translators), that Serbian NLG template may be used at block 254, e.g., by natural language generator 126, to generate output in Serbian.

The pipelines described above and depicted in FIG. 2 may be implemented in various ways. In some implementations one or more of the pipelines may be initiated recursively, e.g., during initiation of another pipeline. For example, the first pipeline 252-254 may be initiated first, and then its initiation may trigger initiation of the second pipeline (256-262). In some such implementations, if the first pipeline returns content with a sufficiently high score before the second pipeline has a chance to finish (e.g., because the speaker's language is well-supported), then the call to the first pipeline may simply return before the call to the second pipeline has completed.

Figure 3A:
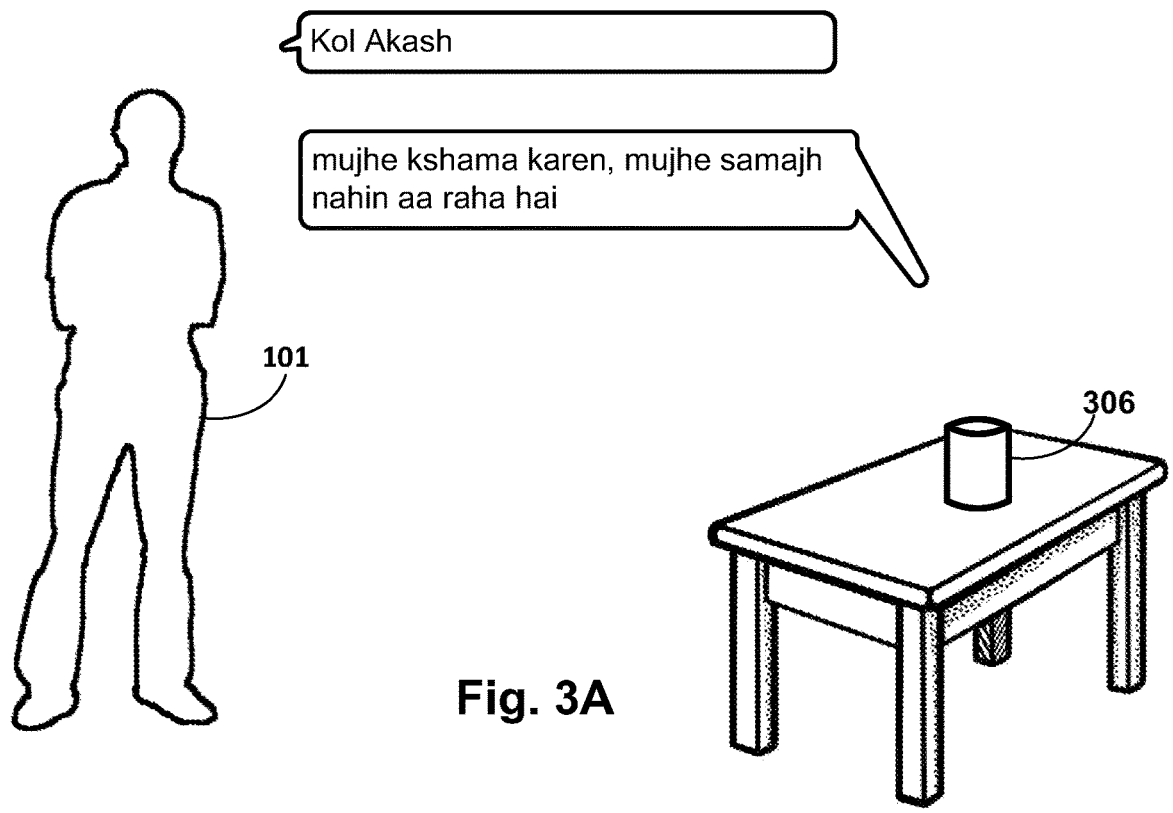
FIGS. 3A and 3B depict example dialogs between a user and an automated assistant, in accordance with various implementations.
Figure 3B:
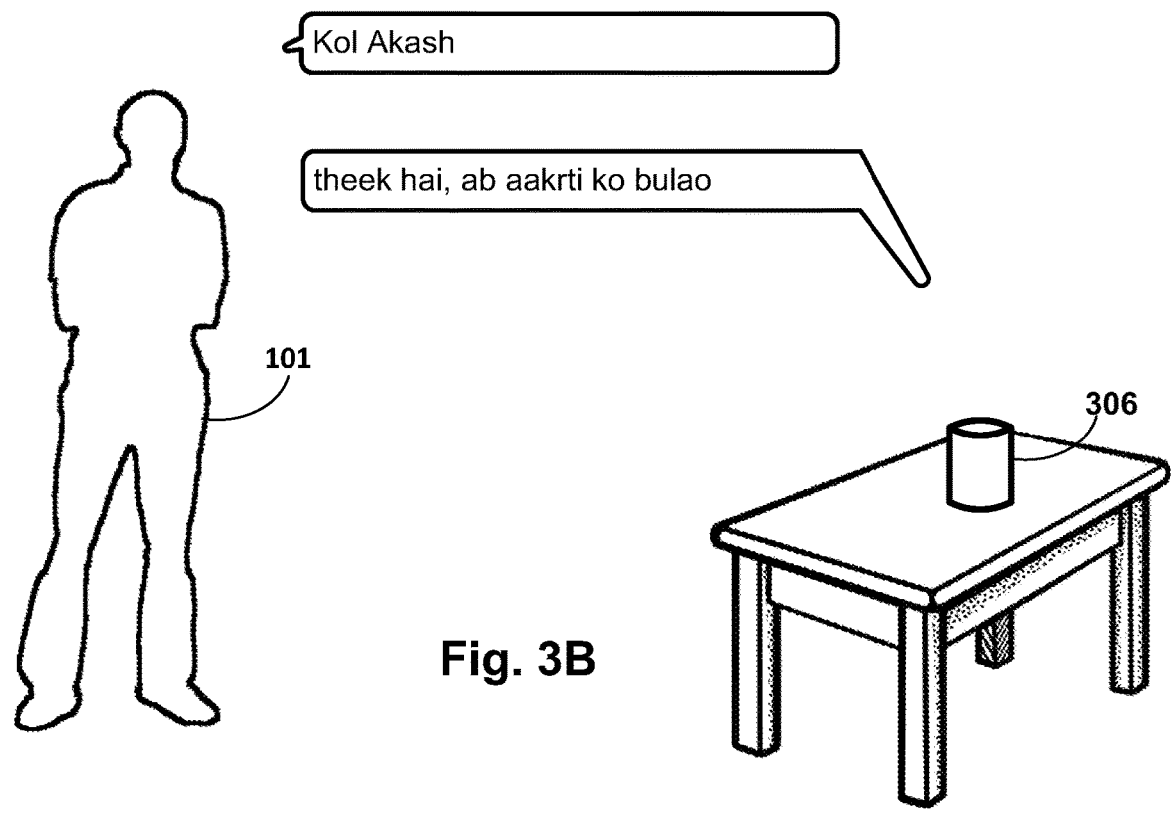

When using the second pipeline (256-262), it may be desirable to leave some terms of the user's query untranslated (e.g., preserve them in the user's native language). This is particularly true for slot values or parameters provided by the user in their native tongue. FIGS. 3A and 3B depict one such example. In FIG. 3A, a user 101 engages with a client device 306 taking the form of an interactive standalone speaker that operates, at least in part, an instance of automated assistant 120. User 101 speaks, in Hindi, the utterance, "Kol Akash," which in English should be interpreted as a command to call a person named "Akash." However, "Akash" sounds similar to the Hindi word "aakaash," which translates to "sky" in English. Accordingly, there is a risk that when the user's utterance is speech recognized and then translated (at block 256), it may be translated as "Call sky." Such a translation would not likely yield an intent that matches the true intent of user 101. Consequently, in FIG. 3A, automated assistant 120 operating at least in part on client device 306 responds, "mujhe kshama karen, mujhe samajh nahin aa raha hai," which translates to "I'm sorry, I don't understand."

However, in some implementations, a slot value may be identified, e.g., by intent matcher 136 and/or by other cloud-based automated assistant components 119, in speech recognition output generated from the user's query. In various implementations, the translation that occurs at block 256 of FIG. 2 may specifically exclude this identified slot value, e.g., so that it is preserved when a matching intent is identified at block 258. Consequently, the second language intent may be identified at block 258 based at least in part on the slot value in the first language. For example, in FIG. 3B, instead of translating "aakaash" to "sky," the term "Kol," which translates to "call," may be identified (e.g., by natural language processor 122) as a term that commonly precedes a slot value and used to determine that the next term "Akash" is likely a person's name. Accordingly, the translation of the user's query will be "Kol Akash," rather than "Kol aakaash," and automated assistant 120 may respond with "theek hai, ab aakrti ko bulao," which means "OK, calling Akash now."

As another example, suppose a user asks, in Italian, "Aggiungi latte alla lista della spesa," which translates in English to "add milk to the shopping list." Here, the user would like to see the word "latte" added to their shopping list, not "milk." Accordingly, using various techniques, such as annotations applied by natural language processor 122, or annotations applied based on the NLU-NMT model describe previously, the term "latte" in the user's original Italian query may be annotated, so that the user's intent (e.g., ADD_TO_SHOPPING_LIST) can be fulfilled with the correct parameter "latte," as intended by the user.

As yet another example, suppose a user asks, in Hindi, "dil se bajao," which directly translates in English to "Play from the heart." However, the user may have actually wanted automated assistant 120 to initiate the Indian film entitled "Dil Se." In this example, "dil se" may be annotated, e.g., by the entity tagger mentioned above, as the Indian film. Consequently, "dil se" may be preserved in Hindi, while the remainder of the user's query (bajao) may be translated to English, such that automated assistant 120 will initiate playback of the film, as the user intended.

In some implementations, implementing multiple processing pipelines as demonstrated in FIG. 2 may introduce latency into the human-to-computer dialog. For example, some implementations of translator 138 may add a latency on the order of a few hundred milliseconds. Accordingly, in various implementations, various mitigating actions may be taken to reduce the effects of latency.

For example, suppose the first pipeline (252-254) generates an intent and/or natural language output that is associated with a high level of confidence. This might be the case where the language used by the user to provide the query is well-supported, or if the user's query happens to match one of a few grammars in the user's language that is well-supported. Consequently, natural language output may be generated in the user's language before the second pipeline (256-262) has time to complete. In this scenario, the processing of the second pipeline may be abandoned once the first pipeline returns natural language output in the user's language.

As another example, translations of commonly-encountered queries (also referred to as "head" queries, as opposed to "long-tail" queries which are less common) in various languages may be cached, e.g., by translator 138 in index 139. As yet another example, in some implementations, a translation model employed by translator 138 may be simpler than a comprehensive translation model that might be used to translate whole documents. In some implementations, the reduced translation model may be tailored towards human-to-computer dialogs, and in particular may be tailored to grammars that are encountered often in human-to-computer dialogs.

In some implementations, translation (i.e. the second pipeline 256-262) may only be employed when it is determined that the language used by the user to provide the initial query is not well-supported. Additionally or alternatively, in some implementations, translation (i.e. the second pipeline 256-262) may only be employed after the first pipeline (252-254) is unsuccessful, e.g., because the intent matched at block 252 or the natural language output candidate generated at block 254 has a low associated confidence measure.

In some implementations, if a particular query is successful in the first pipeline (252-254), that query may be flagged, e.g., with a "triggered" bit, and the triggered bits may be stored (e.g., in database 137) so that when the same query in the same language (or a syntactically/semantically similar query in the same language) is received later, the triggered bit can be checked. Assuming the bit is set (meaning the same or similar query was successful in the first pipeline previously), the processing of the first pipeline may be initiated and the second pipeline may not be initiated (or may only be initiated if the first pipeline fails for some reason).

This idea may be extended in some implementations by building a machine learning classifier that classifies queries as being, for instance, likely successful or likely unsuccessful in the first pipeline. For example, if a query processed using the first pipeline (252-254) yields a successful outcome, that query may be used as a positive training example for a classifier (e.g., neural network, support vector machine, etc.), and a label associated with the positive training example may indicate that it was successful. Similarly, in some implementations, queries that were not processed successfully through the first pipeline may be used as negative training examples. A model such as a neural network may be trained by applying these positive and/or negative training examples across the model to generate output, determining a difference (or error) between the output and the labels, and performing various learning techniques, such as gradient descent (stochastic or batch) and/or back propagation to adjust weights of the model. Thereafter, new queries may be applied as input across the trained model to generate output that indicates, for example, whether they are likely to be successfully processed using the first pipeline. If the answer is yes, then the second pipeline may not be initiated.

Figure 4:
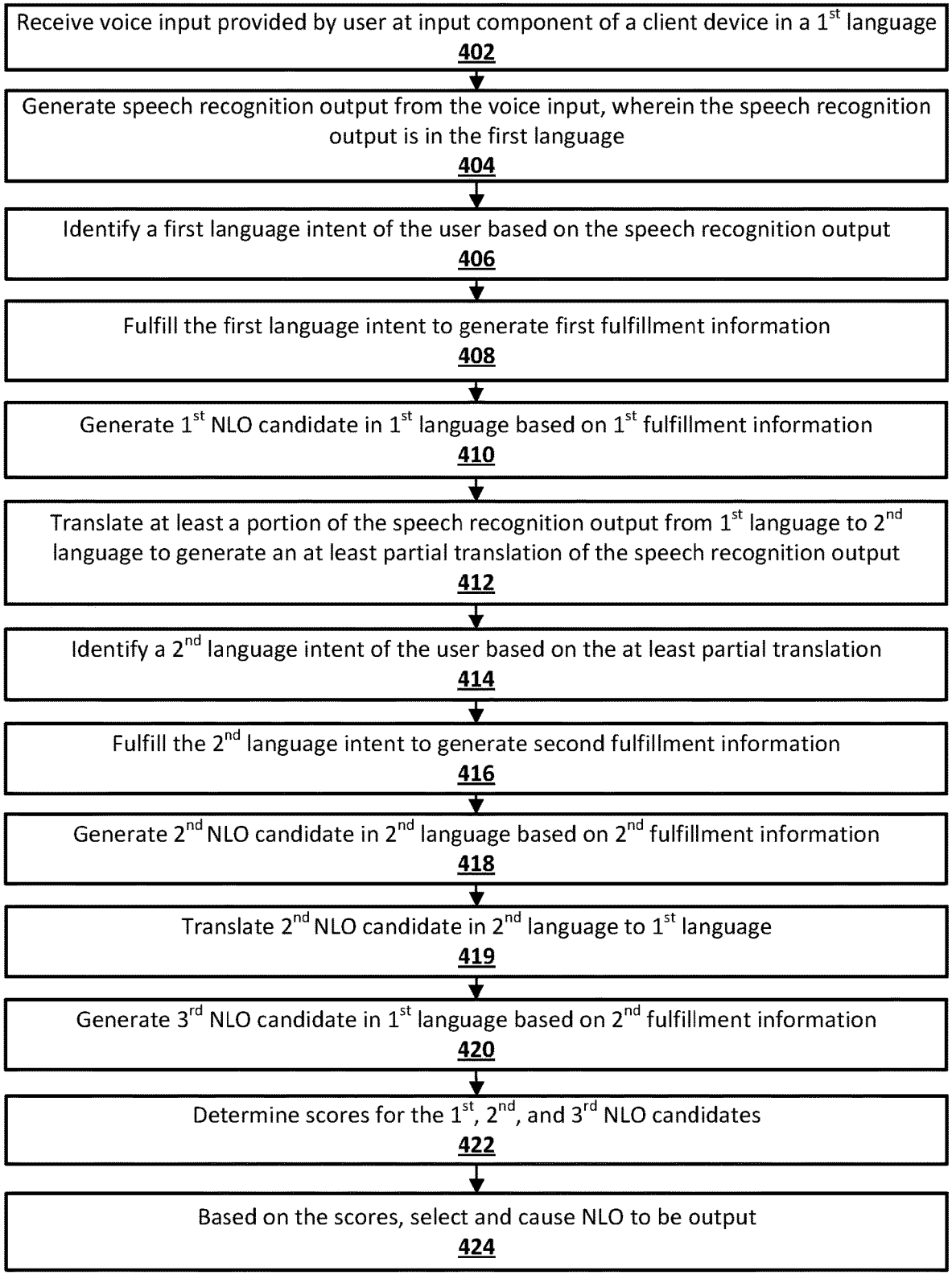
FIG. 4 depicts a flowchart illustrating an example method according to implementations disclosed herein.

FIG. 4 is a flowchart illustrating an example method 400 according to implementations disclosed herein. For convenience, the operations of the flow chart are described with reference to a system that performs the operations. This system may include various components of various computer systems, such as one or more components of computing systems that implement automated assistant 120. Moreover, while operations of method 400 are shown in a particular order, this is not meant to be limiting. One or more operations may be reordered, omitted or added.

At block 402, the system may receive voice input provided by a user at an input component of a client device in a first language, such as the user's native language. At block 404, the system, e.g., by way of STT engine 117 or speech capture/TTS/STT 114, may generate speech recognition output from the voice input. In various implementations, the speech recognition output may include textual data generated from the speech, and in many cases the speech recognition output may also be in the first language. In other implementations in which the user provides the query as typed text (e.g., by way of message exchange client 107), blocks 402-404 may be omitted.

At block 406, the system, e.g., by way of intent matcher 136, may identify a first language intent of the user based on the speech recognition output generated at block 404. This may correspond to block 252 in FIG. 2, and may constitute the beginning of the first pipeline described previously. For example, intent matcher 136 may compare the speech recognition output to one or more grammars in the first language that are stored, for instance, in database 137. Even for languages that are relatively unsupported in the automated assistant ecosystem, there may still be at least a few rudimentary grammars provided in database 137. A match may be found in various ways, such as the speech recognition output being sufficiently similar (semantically and/or syntactically) to one or more grammars. Additionally or alternatively, in some implementations, the system may employ one or more domain-specific trained machine learning models to identify the first language intent.

At block 408, the system may fulfill the first language intent. This may correspond to block 253 in FIG. 2. For example, the system may obtain responsive content from a corpus of documents written at least in part in the first language. Additionally or alternatively, the system may identify one or more actions that are responsive to the first language intent (e.g., commands that match one or more grammars). First fulfillment information may be generated based on the fulfillment of block 408. At block 410, the system, e.g., by way of natural language generator 126, may generate a first natural language output ("NLO" in FIG. 4) candidate in the first language based on the first fulfillment information generated at block 408.

At block 412, the system may translate at least a portion of the speech recognition output from the first language to a second language to generate an at least partial translation of the speech recognition output. This may correspond to block 256 of FIG. 2, and may be the beginning of the second and third pipelines described previously. Thus, in some implementations, operations of block 406-410 and operations of blocks 412-420 may operate in parallel, and/or one set of operations may recursively call the other.

At block 414, the system may identify a second language intent of the user based on the at least partial translation (e.g., corresponding to block 258 of FIG. 2). At block 416, the system may fulfill the second language intent to generate second fulfillment information, similar to block 259 of FIG. 2. At this point, the second and third pipelines diverge. At block 418, the second pipeline continues, and the system may, e.g., by way of natural language generator 126, generate a second natural language output candidate in the second language. At block 419, the second natural language output candidate may be translated to the first language. Meanwhile, at block 420, as part of the third pipeline, the system may, e.g., by way of natural language generator 126, generate a third natural language output candidate directly in the first language, e.g., using a translated NLG template as described previously, or by using other techniques.

At block 422, the system may, e.g., by way of scoring engine 140, determine scores for the first, second, and third natural language output candidates, as shown at block 264 of FIG. 2. Based on the scores determined at block 422, at block 424, the system may select and cause natural language output to be output to the user. For example, if the user provided the initial utterance vocally, then the natural language output may be provided to the user audibly by way of a speaker. If the user provided the initial query as textual input (e.g., using message exchange client 107), then the natural language output may be presented visually, e.g., as part of the ongoing transcript in message exchange client 107.

In some implementations in which the selected content is an action (e.g., play music, order food), the generated natural language candidate may include confirmation that an action will be performed. As will be described in more detail below, in some implementations, the natural language output may be generated in the second language and then translated to the first language (e.g., because the user initially spoke in the first language). In some such implementations, a determination may be made as to whether the translated natural language output satisfies one or more criteria, and if not, replacement natural language output in the second language may be generated, translated, and provided to the user instead.

When natural language output is generated in the second language and then translated to the first language for consumption by the user, it may be the case that the natural language output generated in the second language is not readily translatable, or that the translation fails some test for translation quality. For example, sometimes colloquialisms may be substituted for more rigid and/or formal natural language output in various scenarios (e.g., as dictated by NLG templates) to make automated assistant 120 sound or appear more lifelike. Suppose a user asks about the weather today, and the forecast is for 85 degrees Fahrenheit and sunny. In some instances, rather than simply generating straightforward natural language output to convey this information, automated assistant 120 may instead select (e.g., based on NLG templates) predetermined colloquial phrases, such as "It's gonna be a scorcher, don't forget your sunglasses." However, in the context of a user who speaks a language that is not fully supported by automated assistants, such a colloquial phrase may not translate well to the user's native language.

Figure 5:
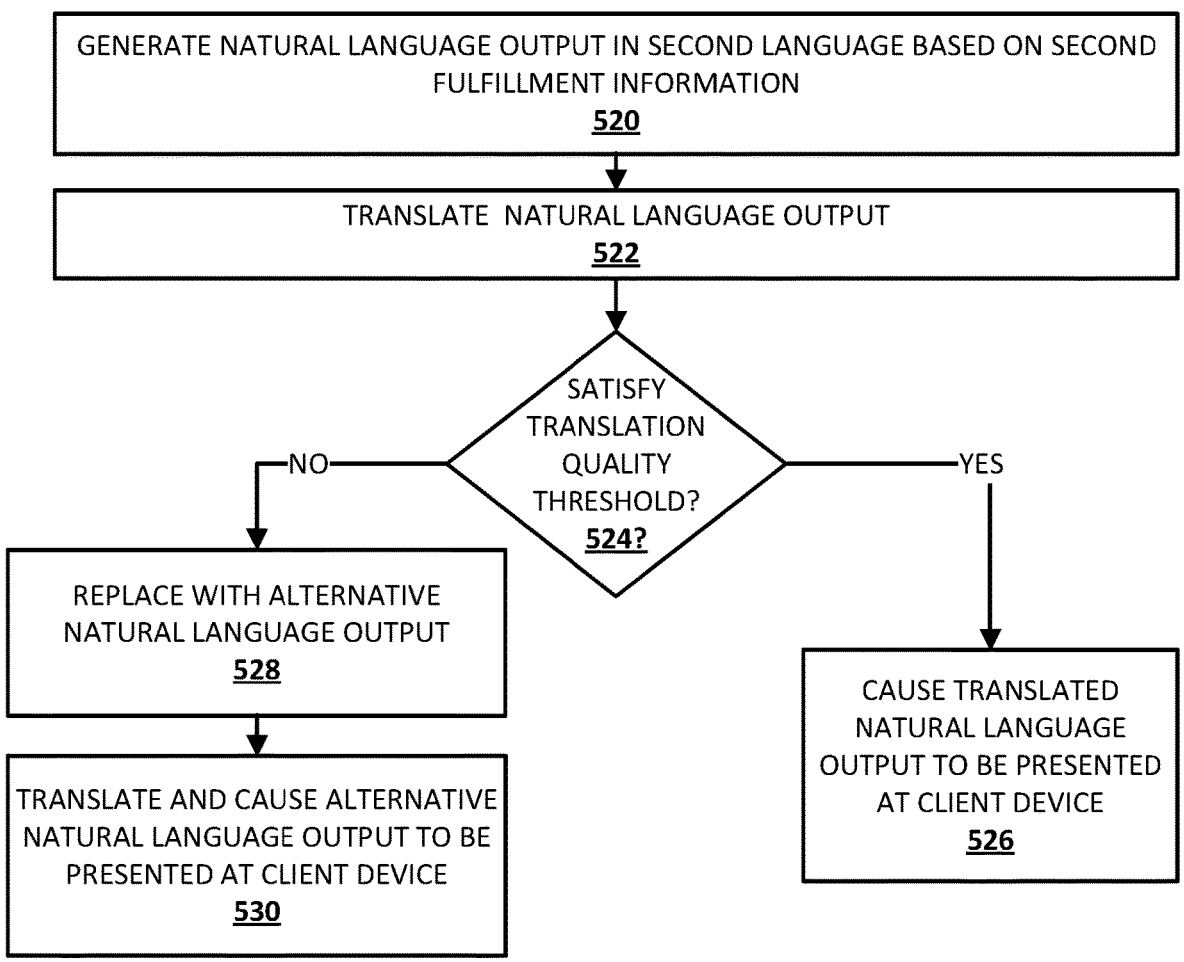
FIG. 5 depicts a flowchart illustrating an example method according to implementations disclosed herein.

Accordingly, in some implementations, various techniques may be employed, e.g., when generating natural language output at block 418, in order to ensure that what the user receives as output makes sense in the user's native language. FIG. 5 depicts one such technique 500 that may be implemented as part of the second pipeline 256-262 of FIG. 2.

At block 520, the system may generate natural language output in the second language, similar to block 260 in FIG. 2. At block 522, the system, e.g., by way of translator 138, may translate the natural language output from the second language (e.g., English or another fully-supported language) to the first language, similar to block 262 of FIG. 2. At block 524, the system may determine whether a measure of quality associated with the translation of block 522 satisfies some criterion, such as a minimum threshold. If the answer is yes, the translation will likely be understandable by the user in the first language, and therefore, at block 526, the translated natural language output may be presented at the user's client device.

However, if the answer at block 524 is no, then the translation may be of a poor quality, and the user may not readily comprehend it (or it may appear clumsy or error-ridden). In such case, at block 528, the system may replace the natural language output generated in the second language at block 520 with alternative natural language output. This alternative natural language output may be more formalistic, generic, lack colloquialisms, or otherwise may be selected to be more easily translated from the second language to the first language used by the user. At block 530, the system, e.g., by way of translator 138, may translate and cause the alternative natural language output to be presented at the user's client device.

Figure 6:
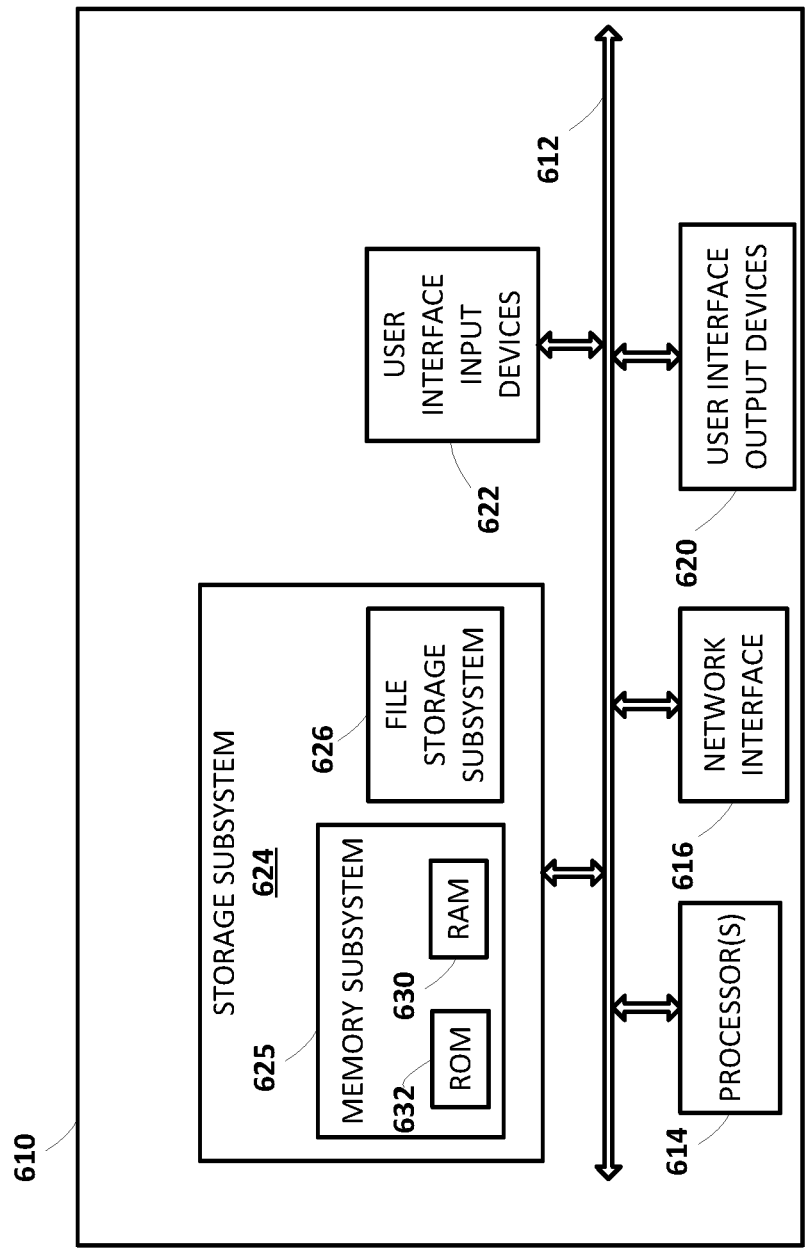
FIG. 6 illustrates an example architecture of a computing device.

FIG. 6 is a block diagram of an example computing device 610 that may optionally be utilized to perform one or more aspects of techniques described herein. In some implementations, one or more of a client computing device, user-controlled resources engine 130, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIGS. 4 and 5A-B, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
receiving voice input provided by a user at an input component of a client device in a first language;
generating speech recognition output from the voice input, wherein the speech recognition output is in the first language;
identifying a first language intent of the user based on the speech recognition output; fulfilling the first language intent to generate first fulfillment information;
based on the first fulfillment information, generating a first natural language output candidate in the first language;
translating at least a portion of the speech recognition output from the first language to a second language to generate an at least partial translation of the speech recognition output, wherein the translating is based on a machine learning model that is trained using one or more logs of user queries submitted to one or more automated assistants during human-to-computer dialogs;
identifying a second language intent of the user based on the at least partial translation;
fulfilling the second language intent to generate second fulfillment information;
based on the second fulfillment information, generating a second natural language output candidate in the second language;
determining scores for the first and second natural language output candidates;
based on the scores, selecting, from the first and second natural language output candidates, a natural language output to be presented to the user; and
causing the client device to present the selected natural language output at an output component of the client device.

2. The method of claim 1, further comprising generating a third natural language output candidate in the first language that is responsive to the second language intent, wherein determining the scores further includes determining scores for the first, second, and third candidates.

3. The method of claim 1, further comprising translating the second natural language output candidate to the first language prior to the scoring.

4. The method of claim 3, wherein translating the second natural language output candidate is based on another machine learning model that is trained using one or more logs of natural language outputs provided by one or more automated assistants during human-to-computer dialogs.

5. The method of claim 1, wherein the scoring is based on respective confidence scores assigned to the first and second language intents.

6. The method of claim 1, wherein the scoring is based on time required to obtain the first and second natural language output candidates.

7. The method of claim 1, further comprising identifying a slot value in the speech recognition output, wherein the at least partial translation of the speech recognition output excludes the slot value, and wherein the second language intent is further identified based on the slot value in the first language.

8. A system comprising one or more processors and memory operably coupled with the one or more processors, wherein the memory stores instructions that, in response to execution of the instructions by one or more processors, cause the one or more processors to perform the following operations:
receiving voice input provided by a user at an input component of a client device in a first language;
generating speech recognition output from the voice input, wherein the speech recognition output is in the first language;
identifying a first language intent of the user based on the speech recognition output;
fulfilling the first language intent to generate first fulfillment information;
based on the first fulfillment information, generating a first natural language output candidate in the first language;
translating at least a portion of the speech recognition output from the first language to a second language to generate an at least partial translation of the speech recognition output, wherein the translating is based on a machine learning model that is trained using one or more logs of user queries submitted to one or more automated assistants during human-to-computer dialogs;

identifying a second language intent of the user based on the at least partial translation;

fulfilling the second language intent to generate second fulfillment information;

based on the second fulfillment information, generating a second natural language output candidate in the second language;

determining scores for the first and second natural language output candidates;

based on the scores, selecting, from the first and second natural language output candidates, a natural language output to be presented to the user; and causing the client device to present the selected natural language output at an output component of the client device.

9. The system of claim 8, further comprising instructions for generating a third natural language output candidate in the first language that is responsive to the second language intent, wherein determining the scores further includes determining scores for the first, second, and third candidates.

10. The system of claim 8, further comprising instructions for translating the second natural language output candidate to the first language prior to the scoring, wherein translating the second natural language output candidate is based on another machine learning model that is trained using one or more logs of natural language outputs provided by one or more automated assistants during human-to-computer dialogs.

11. The system of claim 10, wherein selecting the natural language output includes determining that the translated second natural language output candidate fails to satisfy a translation criterion, and replacing the translated second natural language output candidate with alternative natural language output in the first language.

12. The system of claim 8, wherein the scoring is based on respective confidence scores assigned to the first and second language intents.

13. The system of claim 8, wherein the scoring is based on time required to obtain the first and second natural language output candidates.

14. The system of claim 8, further comprising instructions for identifying a slot value in the speech recognition output, wherein the at least partial translation of the speech recognition output excludes the slot value, and wherein the second language intent is further identified based on the slot value in the first language.

15. At least one non-transitory computer-readable medium comprising instructions that, in response to execution of the instructions by one or more processors, cause the one or more processors to perform the following operations:

receiving voice input provided by a user at an input component of a client device in a first language;

generating speech recognition output from the voice input, wherein the speech recognition output is in the first language;

identifying a first language intent of the user based on the speech recognition output; fulfilling the first language intent to generate first fulfillment information;

based on the first fulfillment information, generating a first natural language output candidate in the first language;

translating at least a portion of the speech recognition output from the first language to a second language to generate an at least partial translation of the speech recognition output, wherein the translating is based on a machine learning model that is trained using one or more logs of user queries submitted to one or more automated assistants during human-to-computer dialogs;

identifying a second language intent of the user based on the at least partial translation;

fulfilling the second language intent to generate second fulfillment information;

based on the second fulfillment information, generating a second natural language output candidate in the second language;

determining scores for the first and second natural language output candidates;

based on the scores, selecting, from the first and second natural language output candidates, a natural language output to be presented to the user; and causing the client device to present the selected natural language output at an output component of the client device.

16. The at least one non-transitory computer-readable medium of claim 15, further comprising generating a third natural language output candidate in the first language that is responsive to the second language intent, wherein determining the scores further includes determining scores for the first, second, and third candidates.

17. The at least one non-transitory computer-readable medium of claim 15, further comprising translating the second natural language output candidate to the first language prior to the scoring.

18. The at least one non-transitory computer-readable medium of claim 17, wherein translating the second natural language output candidate is based on another machine learning model that is trained using one or more logs of natural language outputs provided by one or more automated assistants during human-to-computer dialogs.

19. The at least one non-transitory computer-readable medium of claim 15, wherein the scoring is based on respective confidence scores assigned to the first and second language intents.

* * * * *